(12) United States Patent
Kaura et al.

(10) Patent No.: US 9,730,055 B2
(45) Date of Patent: Aug. 8, 2017

(54) SIGNALLING IN A WIRELESS NETWORK

(75) Inventors: Ricky Kaura, Middlesex (GB); Song Yean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 196 days.

(21) Appl. No.: 14/131,366

(22) PCT Filed: Jul. 11, 2012

(86) PCT No.: PCT/KR2012/005499
§ 371 (c)(1),
(2), (4) Date: Jan. 7, 2014

(87) PCT Pub. No.: WO2013/009093
PCT Pub. Date: Jan. 17, 2013

(65) Prior Publication Data
US 2014/0133401 A1    May 15, 2014

(30) Foreign Application Priority Data

Jul. 12, 2011 (GB) .................................... 1111960.9

(51) Int. Cl.
*H04W 8/24* (2009.01)
*H04W 36/00* (2009.01)
*H04W 52/02* (2009.01)
*H04W 76/02* (2009.01)

(52) U.S. Cl.
CPC ......... *H04W 8/24* (2013.01); *H04W 36/0022* (2013.01); *H04W 52/0235* (2013.01); *H04W 76/026* (2013.01)

(58) Field of Classification Search
None
See application file for complete search history.

(56) References Cited

U.S. PATENT DOCUMENTS

2008/0008127 A1   1/2008 Choi et al.
2010/0120420 A1   5/2010 Agashe et al.
(Continued)

FOREIGN PATENT DOCUMENTS

EP   2 291 014 A1   3/2011
EP   2 302 844 A1   3/2011
(Continued)

OTHER PUBLICATIONS

Nokia Siemens Networks ZTE, Nokia, Huawei, Clarification of ISR usage for CSFB, XP050331790, 3GPP TSG-SA2 Meeting #68, 3GPP Draft 52-087331, Oct. 13-17, 2008, QingDao, China.

*Primary Examiner* — Yaotang Wang
(74) *Attorney, Agent, or Firm* — Jefferson IP Law, LLP

(57) ABSTRACT

In accordance with a first aspect of the present invention, there is provided a method of signalling in a communications network comprising a user equipment, a first radio access network, a second radio access network and a core network, the core network comprising a first packet switched network control node communicatively coupled to the first radio access network, a circuit switched network control node communicatively coupled to the first radio access network, and a second packet switched network control node communicatively coupled to the second radio access network, wherein the second packet switched network control node is capable of forming an association with the circuit switched network control node, in dependence on the user equipment performing an update to the second radio access network, to enable one or more features which employ said circuit switched network control node, the method comprising: receiving a first update of the user equipment from the first radio access network towards the first packet switched network control node; subsequent to the receipt of said first update, receiving an update of the user equipment from the second radio access network towards the second packet switched network control node; sending a context-related message from the second packet switched network control node to the first packet switched network control node, the context-related message comprising association requirement context data indicating an association requirement between the second packet switched network control node and the circuit switched network control node; and receiving a further update of the user equipment from the first radio access network towards the first packet switched network control node, wherein said context-related message is sent before said further update of (Continued)

the user equipment from the first radio access network is received. This has an advantage that the sending of the context-related association requirement context data is independent of the further update of the user equipment towards the first packet switched network control node. The sending of the association requirement context data may thus be reliably achieved even if the receipt of the further update causes suppression of the sending of context-related messages.

18 Claims, 8 Drawing Sheets

(56) References Cited

U.S. PATENT DOCUMENTS

| | | |
|---|---|---|
| 2010/0303012 A1 | 12/2010 | Atarius et al. |
| 2010/0323695 A1 | 12/2010 | Kallio et al. |
| 2011/0013623 A1* | 1/2011 | Hu .................. H04W 68/12 370/355 |
| 2011/0038348 A1 | 2/2011 | Borsella et al. |
| 2011/0090848 A1 | 4/2011 | Kim et al. |
| 2011/0116449 A1* | 5/2011 | Hu et al. ................. 370/328 |
| 2011/0117931 A1 | 5/2011 | Hu et al. |
| 2012/0258704 A1* | 10/2012 | Kim et al. ................. 455/422.1 |

FOREIGN PATENT DOCUMENTS

| | | |
|---|---|---|
| WO | 2010/051873 A1 | 5/2010 |
| WO | 2010/054340 A1 | 5/2010 |

* cited by examiner

SIGNALLING IN A WIRELESS NETWORK

TECHNICAL FIELD

The present invention relates generally to wireless networks, and more specifically, but not exclusively, to a method and apparatus for improving signalling in a network that has the facility to enable or disable an idle mode signal reduction feature.

BACKGROUND ART

Wireless networks, in which a user equipment (UE) such as a mobile handset communicates via wireless links to a network of base stations or other wireless access points connected to a telecommunications network, have undergone rapid development through a number of generations of radio access technology. The initial deployment of systems using analogue modulation has been superseded by second generation (2G) digital systems such as GSM (Global System for Mobile communications), typically using GERA (GSM Enhanced Data rates for GSM Evolution Radio Access) radio access technology, and these systems have themselves been replaced by or augmented by third generation (3G) digital systems such as UMTS (Universal Mobile Telecommunications System), using the UTRA (Universal Terrestrial Radio Access) radio access technology. Third generation standards provide for a greater throughput of data than is provided by second generation systems; this trend is continued with the proposals by the Third Generation Partnership Project (3GPP) of the Long Term Evolution (LTE) system, using E-UTRA (Evolved UTRA) radio access technology, which offers potentially greater capacity and additional features compared with the previous standards.

Note that the term "GERA" is used herein to refer to the radio access technology associated with GERAN (GERA networks), "UTRA" is used to refer to the radio access technology associated with UTRAN (UTRA networks), and similarly the term "E-UTRA" or "LTE" is used to refer to the radio access technology associated with E-UTRAN (E-UTRA networks).

LTE is designed primarily as a high speed packet switched network, and voice services, packet switched voice services and in particular Voice over Internet Protocol Multimedia Subsystem (VoIMS) services are envisaged, whereas previous generation systems such as UMTS support voice services that are primarily circuit switched.

As new technology is introduced, networks are typically deployed which include radio access networks that use a radio access technology according to a recent standard and also legacy radio access networks that use a legacy radio access technology. A user equipment may be typically capable of communication using two or more radio access technologies, so for example the user equipment is able operate using one radio access technology, perhaps offering high capacity, where this is available, but being able to operate using a legacy radio access technology, in those service areas of the network that do not support the other radio access technology, or that do not support preferred features.

In service areas where a radio access network, such as an LTE/E-UTRA network, does not support voice communication, user equipment may follow a defined procedure to fall back to using another radio access network, such as UTRAN or GERAN, for voice communications, typically falling back to circuit switched voice communications, in a so-called Circuit Switched Fallback (CSFB).

Also, a network may implement Idle mode Signalling Reduction (ISR) to reduce signaling load on the network, and in particular to suppress mobility signaling when a user equipment changes its PS domain attachment from a wireless network using one radio access technology to a wireless network using another radio access technology.

DISCLOSURE OF INVENTION

Technical Problem

However, operation of a Circuit Switched Fallback feature may be impeded if Idle mode Signalling Reduction is enabled. In particular, the Circuit Switched Fallback feature may require an association, such as a SGs association, to be established between a packet switched network control node associated with LTE (such as a Mobility Management Entity (MME)) and a circuit switched network control node associated with the legacy network (such as a Mobility Switching Centre (MSC)). The establishment of the association may not occur in some circumstances if a user equipment updates to LTE in idle mode when Idle mode Signalling Reduction is enabled. Furthermore, other features such as a Short Message Service (SMS) using the association may be impeded if the establishment of the association does not occur.

It is an object of the invention to ameliorate disadvantages of the prior art.

Solution to Problem

In accordance with a first aspect of the present invention, there is provided a method of signalling in a communications network comprising a user equipment, a first radio access network, a second radio access network and a core network, the core network comprising a first packet switched network control node communicatively coupled to the first radio access network, a circuit switched network control node communicatively coupled to the first radio access network, and a second packet switched network control node communicatively coupled to the second radio access network, wherein the second packet switched network control node is capable of forming an association with the circuit switched network control node, in dependence on the user equipment performing an update to the second radio access network, to enable one or more features which employ said circuit switched network control node, the method comprising:

receiving a first update of the user equipment from the first radio access network towards the first packet switched network control node;

subsequent to the receipt of said first update, receiving an update of the user equipment from the second radio access network towards the second packet switched network control node;

sending a context-related message from the second packet switched network control node to the first packet switched network control node, the context-related message comprising association requirement context data indicating an association requirement between the second packet switched network control node and the circuit switched network control node; and receiving a further update of the user equipment from the first radio access network towards the first packet switched network control node, wherein said context-related message is sent before said further update of the user equipment from the first radio access network is received.

This has an advantage that the sending of the context-related association requirement context data is independent of the further update of the user equipment towards the first packet switched network control node. The sending of the association requirement context data may thus be reliably achieved even if the receipt of the further update causes suppression of the sending of context-related messages.

In an embodiment of the invention said context-related message is a context request message sent from the second packet switched network control node to the first packet switched network control node, the context request message including an indicator that said association requirement context data is to be stored at the first packet switched network control node. The method may comprise storing said association requirement context data at the first packet switched network control node.

Advantageous Effects of Invention

This has an advantage of enabling the first packet switched network control node to store the association requirement context data. The association requirement context data may, for example, be stored so that it may be used to determine action to be taken following receipt of the further update.

In an embodiment of the invention said association requirement context data comprises an indicator that an association has been formed between the second packet switched network control node and the circuit switched network control node.

This has an advantage that the association requirement context data may be used as an indicator that the user equipment can use a feature that requires an association to be formed between the second packet switched network control node and the circuit switched network control node. This may be used as an indicator that such an association is required if the user equipment updates towards the second packet switched control node.

In an embodiment of the invention the association which has been formed is an association via an SGs interface between the second packet switched network control node and the circuit switched network control node.

This has an advantage that that the indicator may indicate that the user equipment can use a feature requiring an association via an SGs interface, such as a Circuit Switched Fall Back (CSFB) or SMSoverSGs.

In an embodiment of the invention said first radio access network comprises a plurality of routing areas served by the first packet switched network control node; and wherein the second radio access network comprises a tracking area list indicating tracking areas served by the second packet switched network control node, and when said update of the user equipment to the first radio access network is received, the user equipment is in a first routing area of said plurality of routing areas, and when said further update of the user equipment to the first radio access network is received the user equipment is in a second routing area of said plurality of routing areas.

This has an advantage of sending the context-related message comprising association requirement context data in circumstances where a request for a context-related message may not be sent from the first circuit switched control node to the second circuit switched control node, since it may be assumed that the first circuit switched control node already has context-related data for the user equipment.

In an embodiment of the invention the method comprises, in dependence on the step of receiving a further update of the user equipment to the first radio access network, taking action to allow a second association between the second packet switched network control node and the circuit switched network control node to be established in the case of a further update of the user equipment from the second radio access network towards the second packet switched control node.

This has an advantage that a feature requiring an association between the second packet switched network control node and the circuit switched network control node may be enabled in the case of a further update of the user equipment from the second radio access network towards the second packet switched control node. For example, Circuit Switched Fall Back may be enabled if the user equipment returns to E-UTRAN.

In an embodiment of the invention, said taking action to allow a second association between the second packet switched network control node and the circuit switched network control node to be established requires signalling to be received by the second packet switched control node, wherein the signalling would not have been received had the idle mode signalling reduction mechanism not been at least suppressed. For example, a mobility management message may be required.

In an embodiment of the invention the first and second radio access networks are configured with an idle mode signalling reduction mechanism whereby signalling between the first and second packet switched network control nodes and the user equipment may be reduced when the user equipment is in idle mode, and wherein said taking action comprises sending a mobility management message from the first packet switched network control node to the user equipment causing the idle mode signalling reduction mechanism to be deactivated to allow a further update of the user equipment from the second radio access network towards the second packet switched control node.

This has an advantage that the further update of the user equipment from the second radio access network towards the second packet switched control node may cause the enablement of an association between the between the second packet switched network control node and the circuit switched network control node, and thereby enable a feature requiring the association.

In an embodiment of the invention, when the user equipment is first updated to the second radio access network, the idle mode signalling reduction mechanism is set; and said mobility management message is of a message type which is capable of indicating that the idle mode signalling reduction mechanism is to be set, and wherein when said mobility management message does not indicate that the idle mode signalling reduction mechanism is to be set, deactivating the idle mode signalling reduction mechanism when the user equipment is re-attached to the first radio access network.

This has an advantage that a further update of the user equipment from the second radio access network towards the second packet switched control node may be enabled.

In an embodiment of the invention the method comprises storing said association requirement context data as a result of receiving indication of the successful establishment of an association between the second packet switched network control node and the circuit switched network control node.

Said association requirement context data indicates that said one or more features, which employ said circuit switched network control node, are used by the user equipment.

In an embodiment of the invention, said association requirement context data is stored in dependence on the user equipment using a circuit-switched fallback feature, the feature allowing the user equipment to fall back to a circuit switched call in the first radio access network in preference to a packet switched call in the second radio access network.

In an embodiment of the invention said association requirement context data is stored in dependence on the user equipment using a messaging feature, the messaging feature allowing Short Message Service (SMS) messages to be sent using an association between the second packet switched network control node and the circuit switched network control node.

In an embodiment of the invention the messaging feature is Short Message Service over SGs (SMSoverSGs).

In an embodiment of the invention the method further comprises
receiving a further update of the user equipment to the second radio access network; and
establishing an association between the second packet switched network control node and the circuit switched network control node in dependence on:
the further update of the user equipment to the second radio access network; and
the association requirement context data in said context-related message.

In an embodiment of the invention the established association is an association via an SGs interface between the second packet switched network control node and the circuit switched network control node.

In an embodiment of the invention the first packet switched network control node is a Serving GPRS Support Node (SGSN), the second packet switched network control node is a Mobility Management Entity (MME) and the circuit switched network control node is a Mobile Switching Centre (MSC).

In an embodiment of the invention the method comprises initially storing user equipment context data at the first packet switched network control node in response to the step of receiving the initial update of the user equipment to the first radio access network,
wherein the initially stored user equipment context data does not include association requirement context data indicating a requirement for association of the second packet switched network control node with the circuit switched network control node in the case of an update of the user equipment to the second radio access network.

In accordance with a second aspect of the invention there is provided a first packet switched network control node adapted to perform signalling in a communications network,
the communications network comprising a user equipment, a first radio access network, a second radio access network and a core network, the core network comprising said first packet switched network control node communicatively coupled to the first radio access network, a circuit switched network control node communicatively coupled to the first radio access network, and a second packet switched network control node communicatively coupled to the second radio access network,
the second packet switched network control node being capable of forming an association with the circuit switched network control node, in dependence on the user equipment performing an update to the second radio access network, to enable one or more features which employ said circuit switched network control node,
wherein the first packet switched network control node is adapted to:
receive a first update of the user equipment from the first radio access network towards the first packet switched network control node;
receive, subsequent to the receipt of said first update, and in dependence on said second packet switched network control node receiving an update of the user equipment from the second radio access network towards the second packet switched network control node, a context-related message from the second packet switched network control node, the context-related message comprising association requirement context data indicating an association requirement between the second packet switched network control node and the circuit switched network control node; and
receive a further update of the user equipment from the first radio access network towards the first packet switched network control node,
wherein the first packet switched network control node is adapted to receive, and process, the context-related message before said further update of the user equipment from the first radio access network towards the first packet switched network control node is received.

In accordance with a third aspect of the invention there is provided a second packet switched network control node adapted to perform signalling in a communications network,
the communications network comprising a user equipment, a first radio access network, a second radio access network and a core network, the core network comprising a first packet switched network control node communicatively coupled to the first radio access network, a circuit switched network control node communicatively coupled to the first radio access network, and said second packet switched network control node communicatively coupled to the second radio access network,
wherein the second packet switched network control node is capable of forming an association with the circuit switched network control node, in dependence on the user equipment performing an update to the second radio access network, to enable one or more features which employ said circuit switched network control node,
wherein the second packet switched network control node is adapted to:
receive, subsequent to a first update of the user equipment towards the first packet switched network control node, an update of the user equipment from the second radio access network towards the first packet switched network control node; and
send a context-related message to the first packet switched network control node comprising association requirement context data indicating an association requirement between the second packet switched network control node and the circuit switched network control node,
wherein the second packet switched network control node is adapted to send said context-related message before a further update of the user equipment towards the first packet switched network control node is performed.

In accordance with a second aspect of the invention there is provided a communications network adapted to perform signalling, the communications network comprising a user equipment, a first radio access network, a second radio access network and a core network, the core network comprising a first packet switched network control node communicatively coupled to the first radio access network, a circuit switched network control node communicatively coupled to the first radio access network, and a second packet switched network control node communicatively coupled to the second radio access network, wherein the second packet switched network control node is capable of forming an association with the circuit switched network control node, in dependence on the user equipment performing an update to the second radio access network, to enable one or more features which employ said circuit switched network control node, the communications network being adapted to:

receive a first update of the user equipment from the first radio access network towards the first packet switched network control node;

receive, subsequent to receiving said first update, an update of the user equipment from the second radio access network towards the second packet switched network control node;

send a context-related message from the second packet switched network control node to the first packet switched network control node comprising association requirement context data indicating an association requirement between the second packet switched network control node and the circuit switched network control node; and receive a further update of the user equipment from the first radio access network towards the first packet switched network control node, wherein the communications network is adapted to send said context-related message before said further update of the user equipment towards the first packet switched network control node is received.

Further features and advantages of the invention will be apparent form the following description of preferred embodiments of the invention, which are given by way of example only.

MODE FOR THE INVENTION

Figure 1:
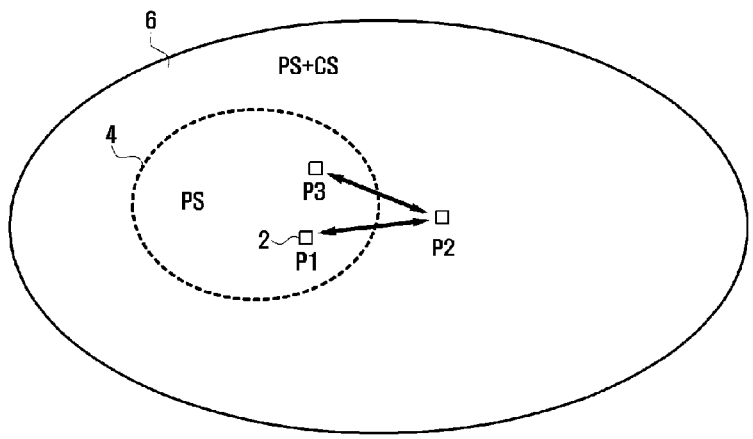
FIG. 1 is a schematic diagram showing a typical arrangement of coverage areas for E-UTRAN and GERAN/UTRAN.

By way of example an embodiment of the invention will now be described in the context of a telecommunication network including a radio access network supporting communication using E-UTRA/LTE radio access technology, as associated with E-UTRAN networks in LTE systems, supporting packet switched voice communication, and another radio access network supporting communication using GERA/UTRA radio access technology, as associated with GERAN/UTRAN networks in GSM/UMTS systems, supporting circuit switched voice communication. However, it will be understood that this is by way of example only and that other embodiments may involve wireless networks using other radio access technologies, such as IEEE802.16 WiMax systems; embodiments are not limited to the use of a particular radio access technology.

Initial deployments of E-UTRAN networks are typically within areas of coverage of existing wireless networks, such as legacy GERAN/UTRAN networks. On initial deployment, a E-UTRAN network may provide service to a smaller geographical area than that covered by existing legacy networks, covering for example a city centre, and the areas covered may not be contiguous. Furthermore, only a subset of the available network features may be enabled, and the enablement of features may not be uniform across the network. In particular, due to its potentially enhanced data capacity in comparison with legacy systems, initial deployments of E-UTRAN may concentrate on providing high bandwidth data services, for example to LTE enabled equipment such as personal digital assistants (PDAs) or to user equipment in the form of plug in communication modules for laptop computers. For this reason, the primary LTE voice service, a packet switched service known a Voice over IMS (VoIMS), may not be available in certain areas. Furthermore, some operators may wish to offer circuit switched voice services in preference to packet switched voice services. Therefore a mechanism has been provided known as Circuit Switched Fall Back (CSFB), which involves steering a user equipment to circuit switched access in an appropriate circuit switched-capable legacy network (e.g. GSM, UMTS, CDMA2000 1×RTT) when a voice call is about to be made.

Additionally, a feature called Idle Mode Signalling Reduction (ISR) may be provided. This feature achieves signalling reduction during inter radio access technology (inter-RAT) cell-reselection in idle mode. Inter-RAT cell reselection refers to moving between a cell in E-UTRAN to a cell in UTRAN/GERAN and vice versa. ISR reduces the need to perform tracking area/routing area updating procedures caused by user equipments moving between S1 mode and Iu or A/Gb mode (S1 mode refers to a user equipment initiating signalling in E-UTRAN, Iu mode refers to a user equipment initiating signalling in UTRAN and A/Gb mode refers to a user equipment initiating signalling in GERAN radio access technologies). ISR may not only reduce signalling between the user equipment and operator's network, but also the signalling between network entities. The scope of ISR activation is typically between one TA-List (Tracking Area List) and one RA (Routing Area).

However when the use of Circuit Switched Fall Back and Idle mode Signalling Reduction are combined together, there may be undesirable effects. In particular, the Circuit Switched Fall Back feature may require an association to be established between a packet switched network control node communicatively coupled to the E-UTRAN radio access network (such as a Mobility Management Entity (MME)) and a circuit switched network control node communicatively coupled with the UTRAN/GERAN radio access network (such as a Mobility Switching Centre (MSC)). The establishment of the association may not occur in some circumstances when Idle mode Signalling Reduction is enabled. For example, FIG. 1 illustrates a situation in which an area of coverage 4 of E-UTRAN is with an area of coverage 6 of UTRAN/GERAN. A user equipment (UE) 2 is initially at a position P1 within the area of coverage 4 of E-UTRAN, and the user equipment then moves to a position P2 in an area of coverage 6 of UTRAN/GERAN, and then moves to position P3 within the area of coverage 4 of E-UTRAN. The user equipment may be in idle mode when it moves from E-UTRAN to UTRAN and back to E-UTRAN, but idle mode signalling reduction may be activated. As a result, it may not be possible to perform Circuit Switched Fall Back when the user equipment moves back to E-UTRAN. This problem may arise as follows. If the user equipment, for example at position P1, performs a combined attach in LTE to establish an association between the MME and MSC, known as a SGs association, and the network supports ISR, then when the user equipment moves to UTRAN, for example at position P2, and performs a combined RA or a separate RA/LA updating procedure towards the SGSN (Serving GPRS Support Node, a packet switched network control node communicatively coupled to the GERAN/UTRAN radio access network), the SGSN will indicate in the response to the updating request from the user equipment (i.e. RAU accept) that ISR is activated. As ISR has been activated by the SGSN, when the user equipment moves back to LTE coverage, for example at position P3, to the same TA or a different TA in the same TA list that covers the ISR activation, the user equipment will not perform TAU and the SGs association will not be re-established.

The need to re-establish the SGs association arises because the SGs association was broken as a result of successful RAU procedure when the user equipment was in UTRAN. When combined RAU procedures are performed, a Gs association is set up between the MSC and SGSN. As a result of setting up this Gs association, the MSC breaks the SGs association with the MME. Similarly, if the user equipment performs normal RA/LA procedure, then on LAU, the MSC breaks the SGs association with the MME.

One known method of ensuring that a SGs association is re-established is to add a "CSFB Capability" bit in the MS network capability information element (IE) which is included in Attach, Combined RAU/LAU or normal RAU. When the user equipment includes this IE, the SGSN stores this capability and uses it for ISR operation. Therefore, if the user equipment is registered initially in E-UTRAN and moves to UTRAN, when the user equipment sends a combined RAU, the SGSN will not indicate that ISR is activated in the RAU Accept message. If the user equipment is registered initially in UTRAN and moves to E-UTRAN and the MME indicates that ISR is activated in the TAU accept message, then if the user equipment moves to another RA (same or different SGSN), the SGSN will indicate that ISR is deactivated by not including the ISR activation bit in the RAU Accept message. The SGSN stores the "CSFB Capability" when the user equipment sends MS Network Capability information element because on subsequent updating procedures, the user equipment only includes this IE if the user equipment changes one or more of the capabilities represented by the MS Network Capability information element. However, this known solution has undesirable effects, since the network deactivates ISR for user equipments which implement a capability for CSFB and/or SMS over SGs but are not configured to use the implemented capability. So, for example, ISR is deactivated for user equipments which primarily use IMS which are able to perform combined procedures (but which are not configured for CSFB and/or SMS over SGs). This may not be optimal, since it may result in unnecessary signalling load to operators' networks (tracking area updating procedures) for UEs that return to E-UTRAN when the ISR is available in the network.

Four approaches to addressing this problem of introducing unnecessary signalling load in the case that a user equipment has a capability for CSFB and/or SMS over SGs but is not configured to use it, can be summarised as follows.

According to the first approach, the "CSFB capability" is renamed to "Combined EMM Procedures capability" to take into account SMSoverSGs and it is advertised in exactly the same way as it was done before. If the SGSN sees this bit in combined RA/LA, it deactivates ISR.

In the second approach, the "Combined EPS/IMSI attach capability" is included in the RAU if the user equipment has been configured for CSFB.

In the third approach, a new information element (IE) is used in the RAU that indicates whether the user equipment was previously successfully combined attached for EPS services and non EPS services in S1 mode.

The fourth approach makes use of the Context Request/Response messages sent between the SGSN and the MME so that the SGSN can retrieve information from the MME to inform it whether a SGs association was set-up for the UE. On combined EPS-attach, the MME stores the fact that a SGs association was set up for the UE. In UTRAN, when the user equipment sends a combined-RAU, as part of the normal procedures, the SGSN sends the context-request to the MME, and the MME includes the indication of "SGs association established" in the context response (along with the already sent ISR capability).

Of these approaches, the fourth approach has the advantage that it may be network based, and so not require any changes to user equipment. An implementation of the fourth approach will now be described. However, it will be seen that the fourth approach has a non-obvious problem, to which an embodiment of the invention may be a solution.

The fourth approach, mentioned above, involves adding the "SGs Association Established Indication" into the "Indication Flags" Information Element (IE) in a Context Response message when the user equipment is in IDLE mode, when the SGSN retrieves the old context from the MME. When the user equipment is in CONNECTED mode, this version of the fourth solution involves adding the "SGs Association Established Indication" to the "Indication Flags" IE in a Forward Relocation Request message where an ongoing call is handed over from E-UTRAN to UTRAN (i.e. the Context Request/Response dialogue will not occur when the RAU is executed by the user equipment in CONNECTED mode).

Figure 2:
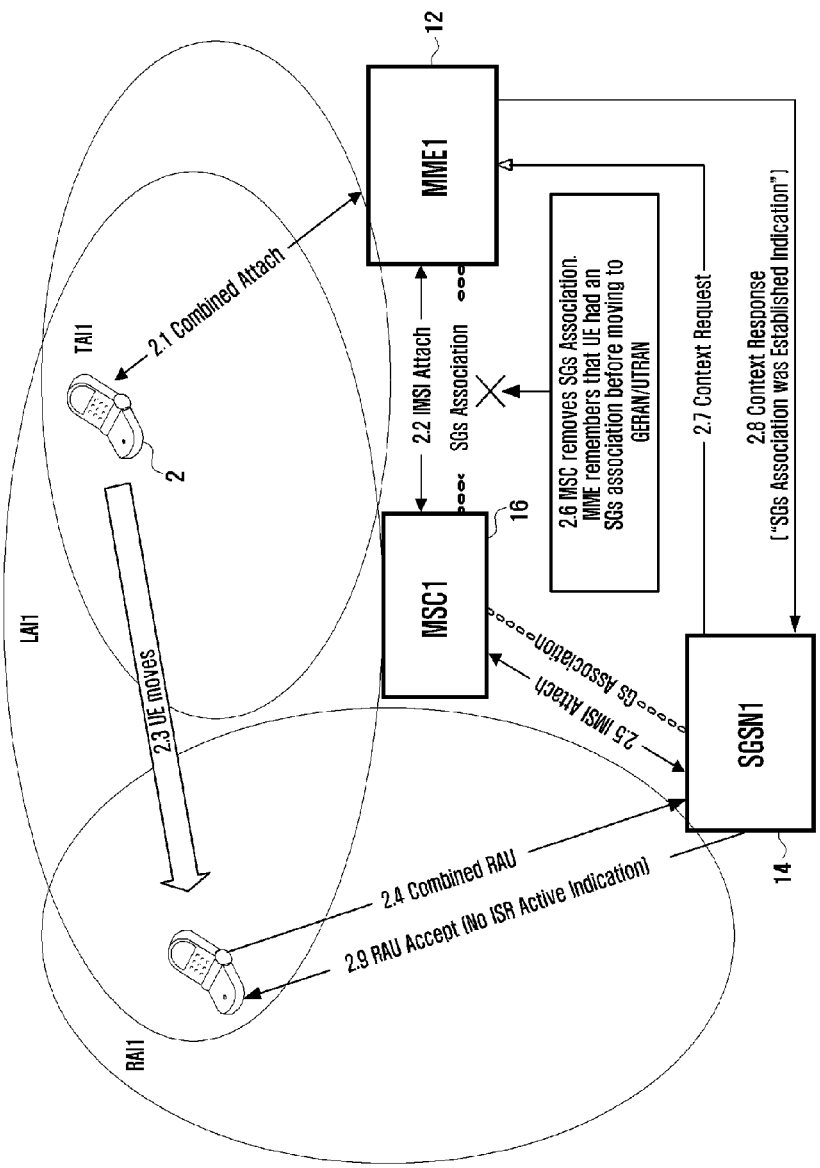
FIG. 2 is a schematic diagram showing a potential approach to suppressing ISR on the basis of a SGs association.

FIG. 2 illustrates the use of a Context Request/Response in the case that the user equipment initially registers in E-UTRAN and the SGSN does not activate ISR, according to fourth approach. At step 2.1, the user equipment initially registers in E-UTRAN in TA1 in MME1 12. At step 2.2, the MME 12 performs an IMSI attach, involving creating a SGs association with MSC1 16. At step 2.3, the user equipment moves to UTRAN. At step 2.4, the user equipment registers in RA1 in SGSN1 14. At step 2.5, the user equipment performs an IMSI attach, involving creating a Gs association with MSC1 16. At step 2.6, this results in the MSC 16 cancelling the SGs association with MME1 12. The MME 12 remembers that the user equipment had a SGs association before moving to UTRAN. At step 2.7, SGSN1 14 sends a Context Request message to MME1 12 to retrieve the user equipment context. At step 2.8, MME1 12 sends back a Context Response to SGSN1 14 with the "SGs Association was Established Indication". At step 2.9, SGSN1 14 sends a RAU Accept to the user equipment which does not contain the ISR indication (i.e. ISR is not activated for this UE).

As an alternative scenario to that illustrated in FIG. 2, a second SGSN may be introduced, SGSN2 (RA2), which overlaps with a second location area LA2 provided by a second MSC, MSC2. In such a scenario, the user equipment may initially register in UTRAN in RA1 in SGSN1, and creates a Gs association with MSC1. The user equipment may then move to E-UTRAN and register in TA1 in MME1, activate ISR, and create a SGs association with MSC1, resulting in cancelling the Gs association with SGSN1. The user equipment may then move to a different RA served by a different SGSN (RA2 in SGSN2. SGSN2 may retrieve the context from MME1 (with the "SGs Association was Established Indication"), and then SGSN2 may create a new Gs association with MSC2. MSC2 may then send a Cancel Location to MSC1 which results in the removal of the SGs association between MSC1 and MME1. SGSN2 sends a RAU Accept to the user equipment which does not contain the ISR indication (i.e. ISR is not activated for this UE).

Figure 3:
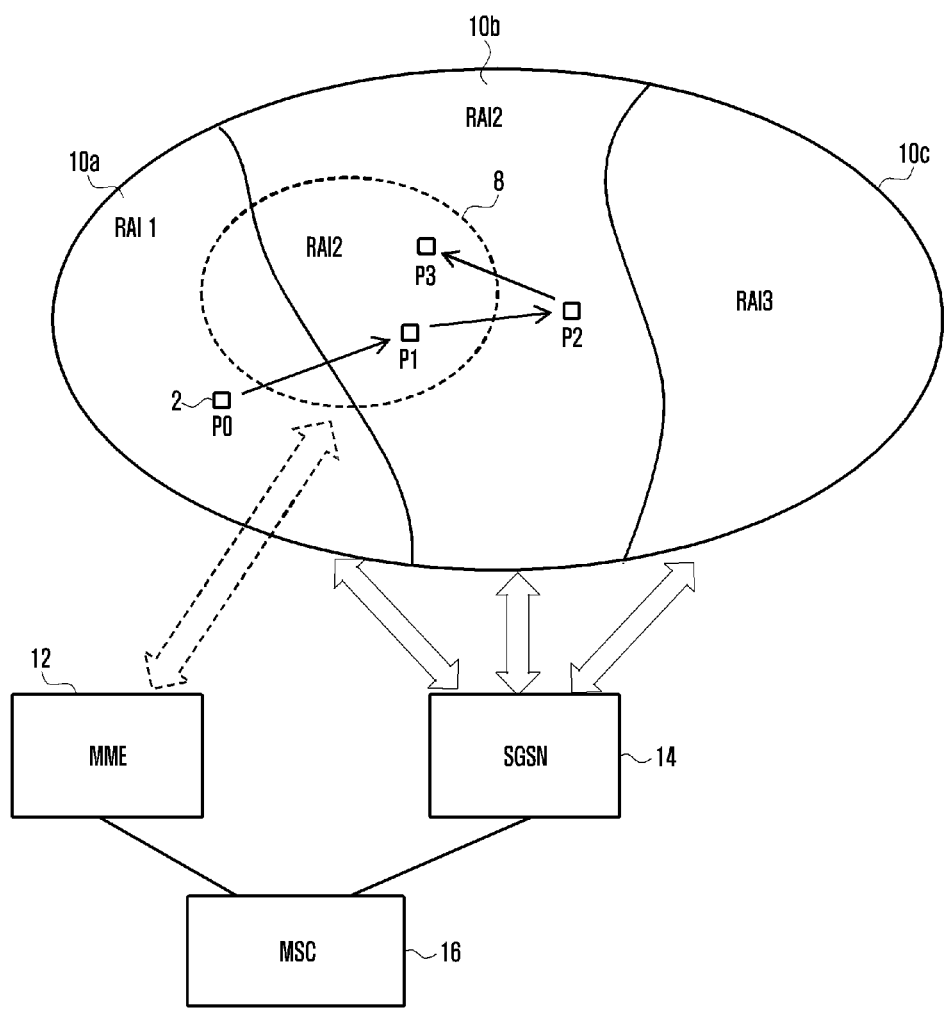
FIG. 3 is a schematic diagram illustrating a scenario which may cause a problem to the approach of FIG. 2.

However, the fourth approach, as described above, has a non-obvious problem in the following scenario, as illustrated by FIG. 3. The user equipment 2 initially attaches to SGSN 14 via UTRAN, for example at position P0 in FIG. 3 at an RA 10*a* served by the SGSN. The user equipment then moves to E-UTRAN, for example at position P1 in TAI1 8 served by the MME, and performs the combined TAU procedure, and ISR is enabled. The MME 12 retrieves the context from the SGSN 14. The user equipment then moves back to UTRAN to another RA 10*b* served by the same SGSN, for example at position P2.

In this scenario, the non-obvious problem is as follows. As the user equipment moves back to the same SGSN, and the SGSN already has the context for the subscriber stored (ISR was active), it will not send a Context Request message to the MME to retrieve the context. Consequently, the MME cannot tell the SGSN that the SGs Association between the MME 12 and the MSC 16 is established and thus there is no way for the SGSN to indicate to the user equipment that ISR is disabled. As a consequence, ISR may be enabled, so that if the user equipment moves back to E-UTRAN, for example to P3 in FIG. 3, no TA update may be performed, and the SGs association may not be re-established.

In an embodiment of the invention, this non-obvious problem is addressed by modifying the fourth approach so that the MME sends the SGs Association Established Indication to the SGSN in the Context Request sent from the MME to the SGSN. This may occur as part of the process of the MME retrieving the context from the SGSN, when the user equipment moves to E-UTRAN and performs the combined TAU procedure. It is not obvious to send information relating to the establishment of an association in a context request message. Conventionally, such information would be sent in a context response message. So, in the embodiment of the invention, the SGs Association Established Indication, which is a type of association requirement context data indicating an association requirement between the MME and the MSC, is sent to the SGSN after receiving an update of the user equipment from the E-UTRAN towards the MME requiring the establishment of the SGs association, but before receiving a further update of the user equipment from the GERAN/UTRAN towards the SGSN. The context request is a type of context-related message.

In an embodiment of the invention, in anticipation of the user equipment moving from E-UTRAN back to UTRAN to a different RA served by the same SGSN that the user equipment originally came from, when the user equipment in E-UTRAN performs the TAU and the MME successfully establishes an SGs association, the MME informs the SGSN that an SGs association was established successfully. When the SGSN receives a Context Request message with the "SGs association established" indication, it stores this indication for later use. When the user equipment sends a Routing Area Update from a different RA served by the same SGSN that the user equipment originally came from, to E-UTRAN, the SGSN already has the user equipment context and may query, for example, its internal memory/disk to find the value of the "SGs associated established" indication. If this indication is TRUE, the SGSN deactivates ISR by not including the "ISR flag" in the RAU-Accept. If this indication is FALSE, the SGSN can extend the ISR area by returning the "ISR flag" in the RAU-Accept. There are no impacts to the user equipment with this embodiment of the invention.

Embodiments of the invention provide an improved solution to the problem outlined above of unnecessarily disabling ISR, when a user equipment has a capability to implement CSFB or SMSoverSGs, but is not configured to use the capability, for example in IMS Voice configured user equipments. The problem may occur in existing technology, that may rely on the user equipment to indicate the "EMM Combined Procedures Capability" and therefore is not optimal in deactivating ISR, i.e. the SGSN will deactivate ISR for user equipments that have this capability, but are not configured for CSFB or SMSoverSGs.

Embodiments of the invention provide an improved solution over the fourth approach, as described above, which may not provide a solution for the case where the user equipment initially registered in UTRAN, moved to E-UTRAN (and ISR is activated) and then moved back to UTRAN to a different RA under the same SGSN.

So, as described above, an embodiment of the invention provides an improved network based solution for the disabling of ISR for UEs that are configured for CSFB and SMSoverSGs which uses the establishment of a successful SGs association as a trigger for deactivating ISR, completing the network based solution by solving a specific issue that is likely to occur in real-world deployments, that is to say the situation already mentioned where the user equipment initially registered in UTRAN, moved to E-UTRAN (and ISR is activated) and then moved back to UTRAN to a different RA under the same SGSN.

As described above, for example in relation to FIG. 3, the fourth approach addresses the scenario where the user equipment initially registers in E-UTRAN and then moves to UTRAN coverage, or where the user equipment initially registered in UTRAN, moves to E-UTRAN and then moves to a RA which is under a different SGSN to that where the user equipment initially registered.

An advantage of an embodiment of the invention is that it provides a solution, to the scenario where the user equipment initially registered in UTRAN, moves to E-UTRAN and then moves to a different RA which is under the same SGSN to that where the user equipment initially registered.

Figure 4:
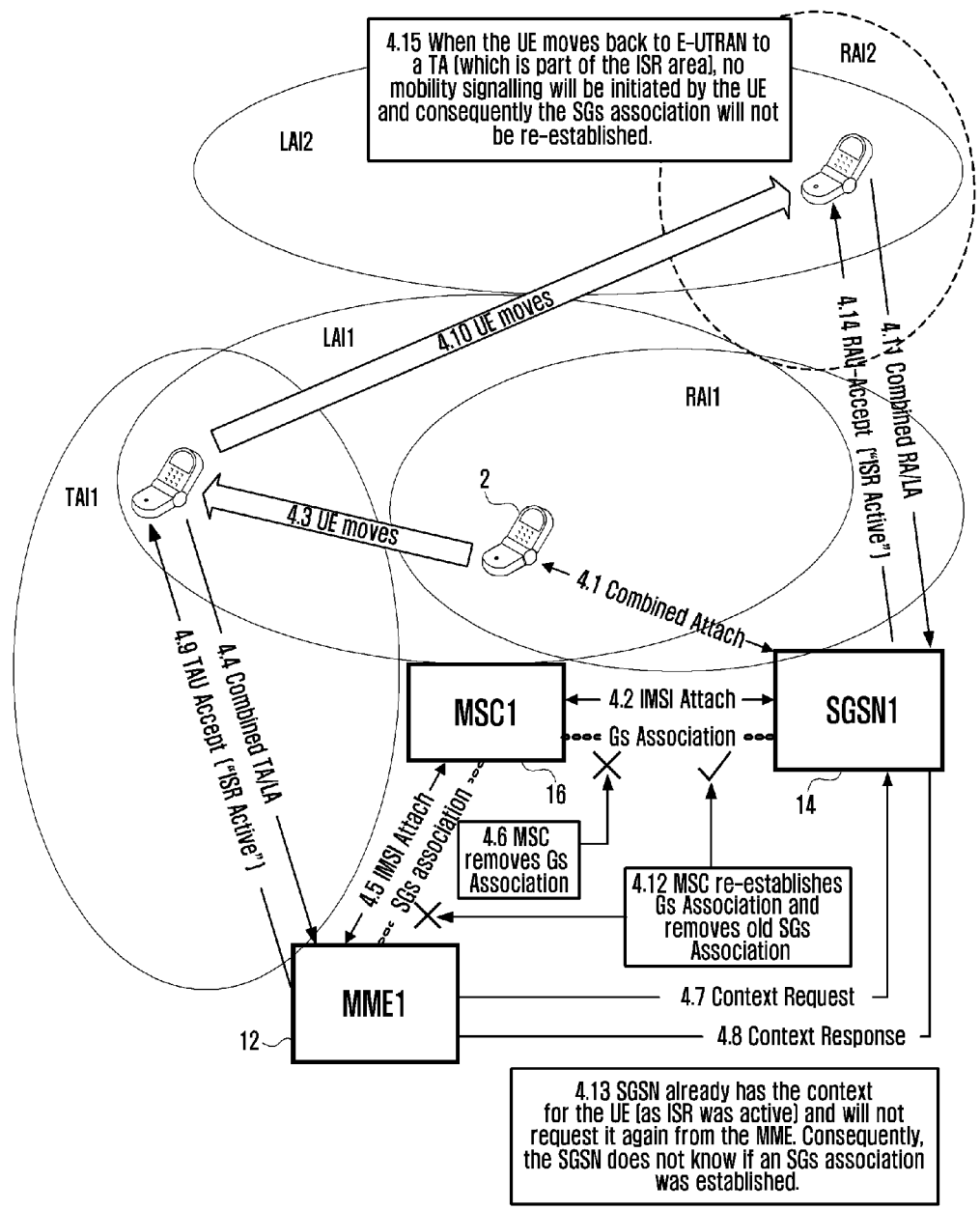
FIG. 4 is a schematic diagram illustrating a problem with the approach of FIG. 2.

FIG. 4 illustrates the problem with the fourth approach: it can be seen that ISR is activated at step 4.14. as a result, at step 4.15, when the user equipment moves back to E-UTRAN, to a tracking area (TA) which is part of the ISR area, no mobility signalling will be initiated by the user equipment and consequently the SGs association will not be re-established. This approach relies on the node that receives the registration request sending a Context Request to retrieve the user equipment context from the previous MME, but does not anticipate that the SGSN may not necessarily always need to send a Context Request, as it may already have the context for the user equipment in the case that ISR is active.

Figure 5:
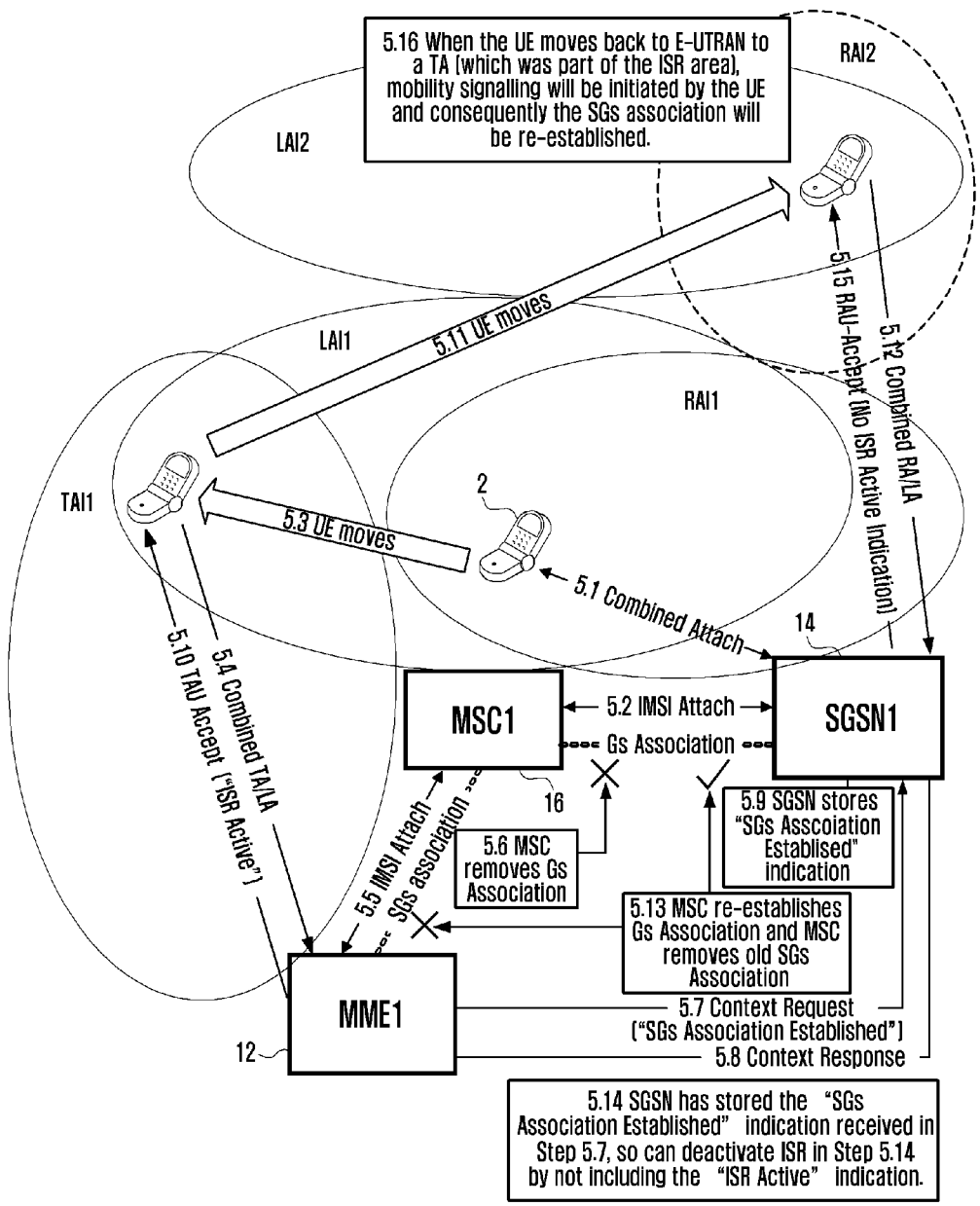
FIG. 5 is a schematic diagram illustrating an embodiment of the invention.

FIG. 5 provides illustrates an embodiment of the invention providing a solution to the problem illustrated by FIG. 4. As illustrated in FIG. 5, the MME informs the SGSN (to which the user equipment initially registered when in UTRAN) that a SGs association has just been successfully established, and the SGSN stores this indication. If the same SGSN then receives a registration request for that user equipment (i.e. the user equipment has moved to a different RA under the control of the same SGSN), the SGSN can identify that the user equipment had a SGs association established when the user equipment was in E-UTRAN. Consequently, the SGSN is able to deactivate ISR by not including the ISR indication in the RAU-Accept.

As illustrated by FIG. 5, at step 5.1, the user equipment is initially in UTRAN and performs Combined Attach towards SGSN1 from RAI1. At step 5.2, the SGSN performs IMSI Attach procedure with MSC1 to establish the Gs Association. At step 5.3, the user equipment then moves to TAI1 served by MME1. At step 5.4, the user equipment performs a Combined TA/LA procedure with MME1. At step 5.5, MME1 performs IMS Attach procedure with MSC1 to establish the SGs Association. At step 5.6, the MSC1 removes the Gs association with the SGSN, but the old context is not deleted from the SGSN1 as the network supports ISR. At step 5.7, on successful set up of the SGs association, the user equipment includes the indication "SGs Association Established" in the Context Request message sent to the SGSN. At step 5.8, the SGSN1 replies with Context Response. At step 5.9, the SGSN1 stores the "SGs Association Established" indication. At step 5.10, the MME1 indicates to the user equipment in the TAU-Accept that ISR is Active. At step 5.11, the user equipment moves to RAI2 under the control of the same SGSN. At step 5.12, the user equipment performs Combined RA/LA. At step 5.13, the SGSN1 re-establishes the Gs Association and removes the old SGs Association. At step 5.14, the SGSN1 checks the value of the "SGs Association Established" indication. At step 5.15, as the SGSN1 has stored the "SGs Association Established" indication previously (which indicates that there was an SGs Association Established on receiving the registration request) ISR is deactivated by the SGSN not including the "ISR" flag in the RAU-Accept. Then at step 5.16, when the user equipment returns to E-UTRAN to a TA that was part of the original ISR area when ISR was activated, as ISR is now deactivated, the user equipment will perform TAU and re-establish the SGs association.

Figure 6:
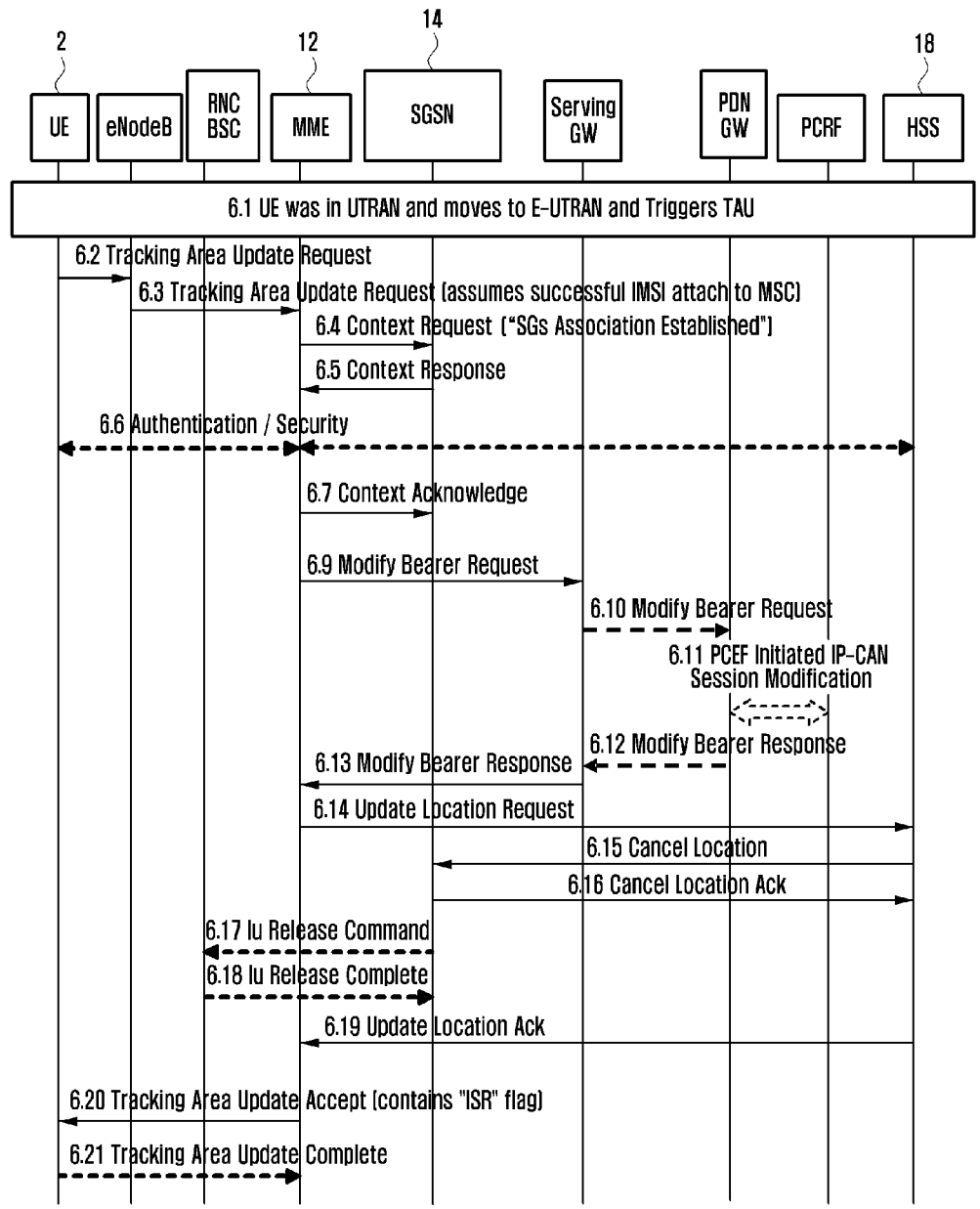
FIG. 6 is a schematic diagram illustrating signalling according to an embodiment of the invention.

FIG. 6 shows message flow in an embodiment of the invention showing the actions of the MME when the user equipment moves to E-UTRAN from UTRAN. Note that at step 6.4, the context request message includes an indicator that SGs association has been established.

Figure 7:
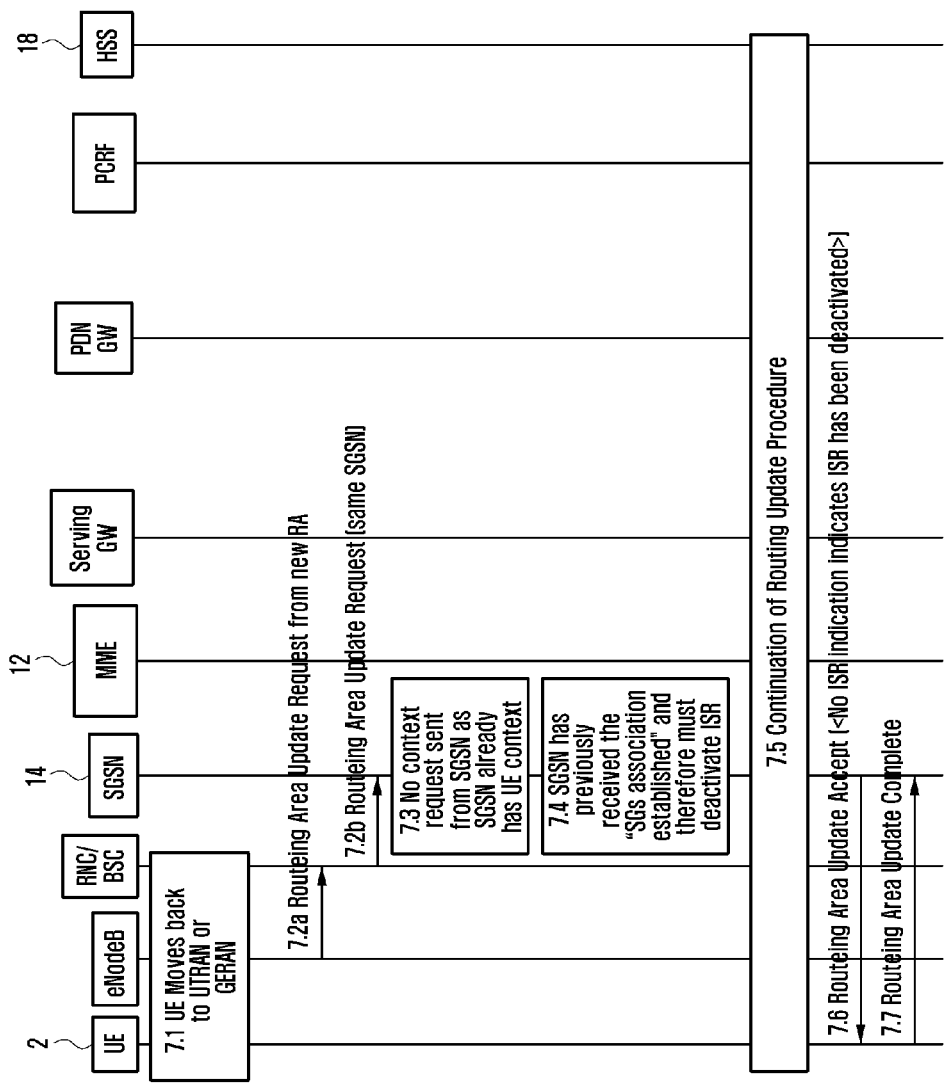
FIG. 7 is a schematic diagram illustrating signalling according to an embodiment of the invention.

FIG. 7 shows message flow and logic performed at the SGSN in an embodiment of the invention when the user equipment moves back to UTRAN to a new RA served by the same SGSN. At step 7.3, no context request is sent from the SGSN, as the SGSN already has the user equipment context. At step 7.4, the SGSN has previously received the "SGS association established" indicator, and therefore deactivates ISR. At step 7.6, no ISR indicator is sent.

Table 1 shows an example of how a SGs Association Establishment Indication may be included as an Information Element in a Context Request, in embodiment of the invention.

Table 2 shows an example how a SGs Established Indication (SAEI) may be coded as an Information Element, in embodiment of the invention. In this example, if the SAEI bit is set to 1, it indicates that a SGs association has been established for the user equipment before the user equipment moves to GERAN/UTRAN.

TABLE 1

<Example of Information Elements in a Context Request>

| Information elements | P | Condition/Comment | IE Type | Ins. |
|---|---|---|---|---|
| IMSI | C | IMSI shall be included if the UE has been successfully authenticated. | IMSI | 0 |
| GUTI | C | The New MME shall include this IE over S10 interface. | GUTI | 0 |
| Routeing Area Identity(RAI) | C | This IE shall be included over S3/S16 interface, if the GUTI indicates the old node is an SGSN, the new MME maps this IE from GUTI. | ULI for RAI | 0 |
| Packet TMSI(P-TMSI) | C | This IE shall be included over S3/S16 interface. For the S3 interface, if sent by the MME, this IE is derived by the MME from the GUTI received from the UE. | P-TMSI | 0 |
| P-TMSI Signature | C | This IE shall be included over S3/S16 interface if it is received from the. | P-TMSI Signature | 0 |
| Complete TAU request message | C | The new MME shall include this IE, and the old MME may use this IE for integrity check. | Complete Request Message | 0 |
| S3/S16/S10 Address and TEID for Control Plane | C | This IE specifies the address and the TEID for control plane message which is chosen by the new MME/SGSN. In case of SGSN pool, the IPv4 or the IPv6 address field shall be set to the same value of the Source IP address of the IP packet carrying this message, and the relaying SGSN shall not change the content of this IE when sending it to the old SGSN. | F-TEID | 0 |
| UDP Source Port Number | C | If an SGSN within the same SGSN pool as the old SGSN receives this message, the SGSN shall include the UDP Source Port number of the received message in this parameter if this IE is not present and relay the message to the old SGSN. The old SGSN shall use this UDP port as the UDP destination port of the Context Response message. | Port Number | 0 |

TABLE 1-continued

<Example of Information Elements in a Context Request>

| Information elements | P | Condition/Comment | IE Type | Ins. |
|---|---|---|---|---|
| RAT Type | C | The RAT Type indicates the Radio Access Technology which is used in the new system. | RAT Type | 0 |
| Indication | O | This IE shall be included if any one of the applicable flags is set to 1. Applicable Flags are: The MS Validated indicates that the new system has successfully authenticated the UE, or the new system has validated the integrity protection of the TAU request message. SGs Association Established Indication: this flag shall be set to 1 on S3 interface if SGs association has been established for the UE before the UE moves to GERAN/UTRAN. | Indication | 0 |
| Hop Counter | O | If an SGSN within the same SGSN pool with the old SGSN receives this message, the SGSN shall decrement the Hop Counter if this IE is present in the received message; otherwise, the SGSN may include a Hop Counter with a value of max-1, and may relay the message to the old SGSN. | Hop Counter | 0 |
| Target PLMN ID | CO | If available, this IE shall be included in order to allow old MME/SGSN to make a judgment whether un-used authentication vectors to be distributed or not. | Serving Network | 0 |
| MME/S4-SGSN LDN | O | This IE is optionally sent by the MME/S4-SGSN to the peer MME/S4-SGSN on the S3/S10/S16 interfaces (see 3GPP TS 32.423 [44]), when communicating the LDN to the peer node for the first time. | Local Distinguished Name (LDN) | 0 |
| Private Extension | O | | Private Extension | VS |

TABLE 2

<Example of coding of SGs Established Indication (SAEI) coded as an Information Element>

| Oc-tets | Bits | | | | | | | |
|---|---|---|---|---|---|---|---|---|
| | 8 | 7 | 6 | 5 | 4 | 3 | 2 | 1 |
| 1 | Type = 77 (decimal) | | | | | | | |
| 2 to 3 | Length = n | | | | | | | |
| 4 | Spare | | | | | | Instance | |
| 5 | DAF | DTF | HI | DFI | OI | ISRSI | ISRAI | SGWCI |
| 6 | SQCI | UIMSI | CFSI | CRSI | P | PT | SI | MSV |
| 7 | Spare | Spare | Spare | Spare | Spare | SAEI | ISRAU | CCRSI |
| 8 to (n + 4) | These octet(s) is/are present only if explicitly specified | | | | | | | |

Figure 8:
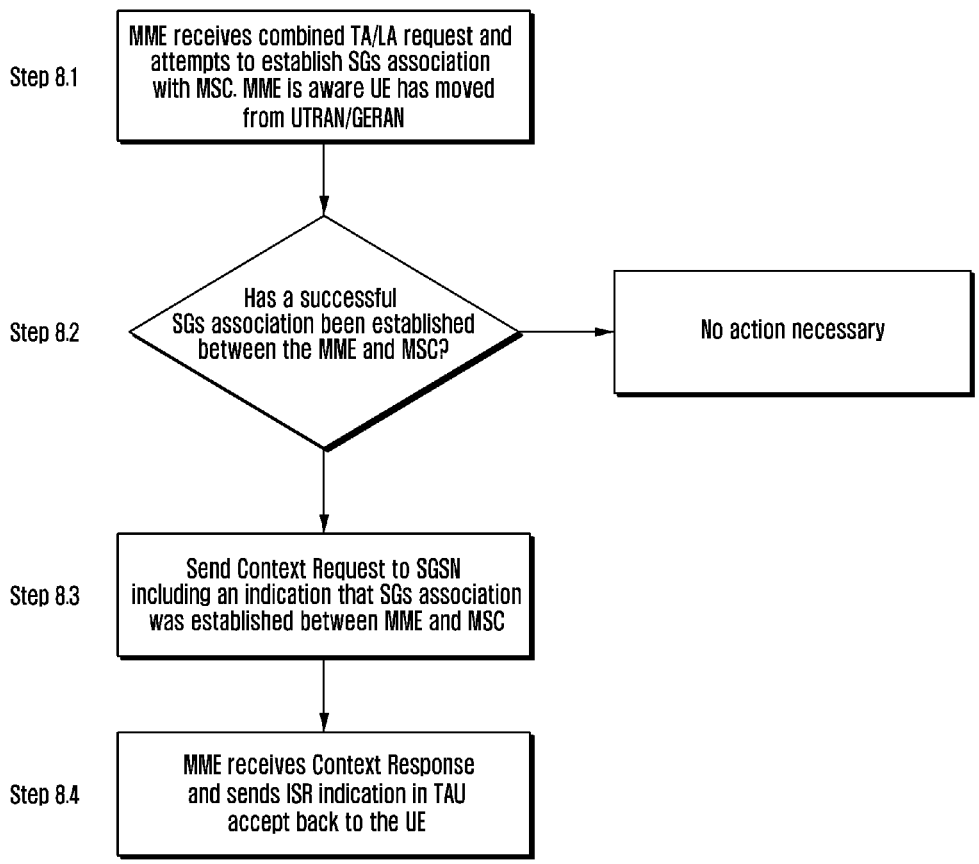
FIG. 8 is a flow diagram illustrating procedures at an MME according to an embodiment of the invention.

FIG. 8 is a flowchart showing procedures carried out at an MME in an embodiment of the invention. At step 8.1, the MME receives a combined TA/LA update request and initiates establishment of an SGs association with the MSC. The MME has information that the user equipment has moved from a UTRAN/GERAN radio access network. At step 8.2, the MME determines whether or not a successful SGs association has been established between the MME and MSC. If not, no action is necessary. If it has, then at step 8.3, a context request message is sent to the SGSN including an indication that a SGs association was established between the MME and MSC. Then, at step 8.4, the MME receives the context response message and sends an ISR indication in a Tracking Area Update (TAU) accept message to the user equipment.

Figure 9:
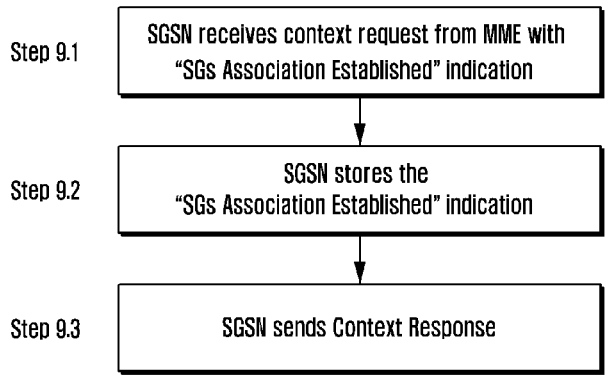
FIG. 9 is a flow diagram illustrating procedures at a SGSN on receipt of a context request according to an embodiment of the invention.

FIG. 9 is a flowchart showing procedures carried out at a SGSN on receipt of a Context Request in an embodiment of the invention. At step 9.1, the SGSN receives a context request from the MME including a SGs Association Established indication. At step 9.2, the SGSN stores the SGs Association Established indication. At step 9.3, the SGSN send a context response.

Figure 10:
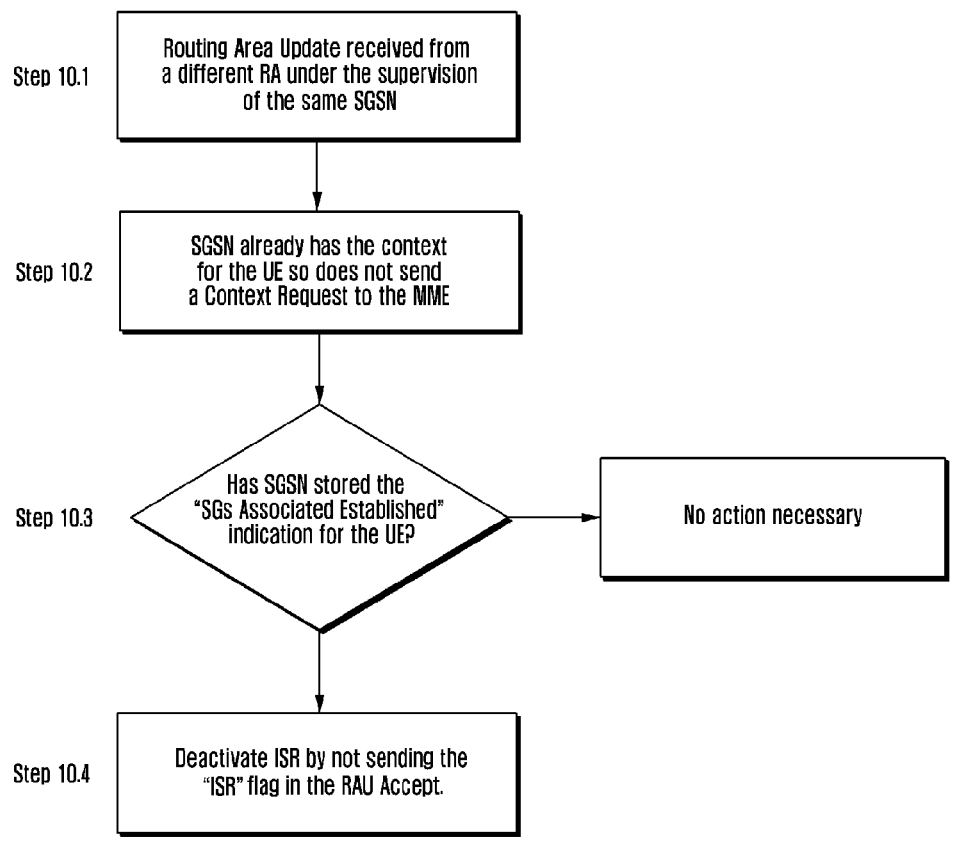
FIG. 10 is a flow diagram illustrating procedures at a SGSN on receipt of a Routing Area update request according to an embodiment of the invention.

FIG. 10 is a flowchart showing procedures carried out at a SGSN on receipt of a Routing Area Update (RAU) request in an embodiment of the invention. At step 10.1, a Routing Area Update request is received from a different Routing Area from that in which the user equipment was previously registered, both Routing Areas being under the control of the same SGSN. At step 10.2, the SGSN does not send a Context Request to the MME, as it already has the context for the user equipment. At step 10.3, it is established whether or not the SGSN has stored the SGs Association Established Indication for the user equipment. If it has not, no action is necessary. If it has, then at step 10.4, the ISR flag is not sent in the Routing Area Update accept message, thereby deactivating ISR. If the UE subsequently moves into an E-UTRAN area, mobility signalling may take place, and a SGs association may be established, so that Circuit Switch Fall Back and/or SMSoverSGs features may function correctly.

To summarise an embodiment of the invention, a first packet switched network control node, for example a MME, provides an indication to a second packet switched network control node, for example a SGSN, and in particular a S4 enabled SGSN (S4-SGSN) when a SGs association is established. The indication may be provided in the existing Context Request message, and the indication may be sent in an existing Indication Information Element (IE), for example, a spare bit in this IE may be reserved for the "SGs Association Established" indication. The second packet switched network control node, for example a SGSN, stores the SGs Association Established indication when received in the Context Request message from the MME. The second packet switched network control node may act on the receipt of a Routing Area Update from a new Routing Area to read, for example, its internal storage/disk to check the value of the SGs Association Established indication, and to deactivate ISR if the SGs Association Enabled indication has the value TRUE and indicates this to the user equipment existing procedure by not including the ISR flag in the Routing Area Accept message. The Mobile Station, that is to say the user equipment, may operate according existing procedures and need not be modified.

Figure 11:
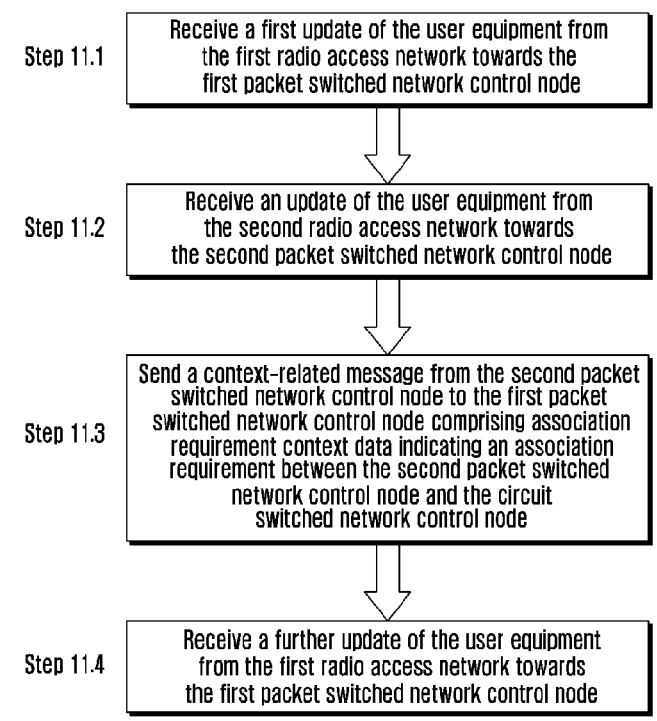
FIG. 11 is a flow diagram illustrating an embodiment of the invention.

FIG. 11 is a flow chart illustrating an embodiment of the invention. At step 11.1, a first update of the user equipment is received from the first radio access network towards the first packet switched network control node. At step 11.2, an update of the user equipment is received from the second radio access network towards the second packet switched network control node, subsequent to step 11.1. At step 11.3, a context-related message is sent from the second packet switched network control node to the first packet switched network control node comprising association requirement context data indicating an association requirement between the second packet switched network control node and the circuit switched network control node. At step 11.4, a further update of the user equipment from the first radio access network towards the first packet switched network control node is received, subsequent to step 11.3. The steps shown in FIG. 11 relate to signalling in a communications network, the communications network comprising a user equipment, a first radio access network, typically a GERAN/UTRAN network, a second radio access network, typically a E-UTRAN network and a core network. The core network comprises a first packet switched network control node, such as a serving GPRS Support Node (SGSN) communicatively coupled to the first radio access network, a circuit switched network control node, such as a Mobility Switching Centre (MSC), communicatively coupled to the first radio access network, and a second packet switched network control node such as a Mobility Management Entity (MME) communicatively coupled to the second radio access network.

The second packet switched network control node is capable of forming an association with the circuit switched network control node, such as an SGs association, in dependence on the user equipment performing an update to the second radio access network, such as a combined TA/LA update. Typically, a SGs association may be enabled following a TA/LA update. The forming of the association may enable one or more features which employ the circuit switched network control node, which may be a MSC. Typical features include Circuit switched Fall Back and SMSoverSGs.

As shown in FIG. 11, a first update of the user equipment from the first radio access network towards the first packet switched network control node is received, indicating that the user equipment is in the GERAN/UTRAN network. Subsequent to this, an update of the user equipment from the second radio access network towards the second packet switched network control node is received, typically by the core network, indicate that the user equipment is in the E-UTRAN network.

A context-related message, such as a context request message, is sent from the second packet switched network control node (e.g. MME) to the first packet switched network control node (e.g. SGSN), the context-related message comprising association requirement context data indicating an association requirement between the second packet switched network control node and the circuit switched network control node. The association requirement context data may be an indicator that indicates that a SGs association has been established. If the association has at some point been established, it may be deduced that the association is required. However, another indicator may be used, for example an indication that a feature requiring the association is used by the user equipment, which may be an indicator that a circuit switched fall back feature is used.

A further update of the user equipment from the first radio access network towards the first packet switched network control node is then received, after the context-related message is sent. Typically, the further update indicates that the user equipment has returned to the GERAN/UTRAN. The context-related message may be a context request message sent from the second packet switched network control node, e.g. the MME, to the first packet switched network control node, e.g. the MME. This may be an advantageous approach compared with sending the association requirement context data in a context response message, if the user equipment has returned to a routing area served by the same SGSN, a context response message may not be requested, because it would be assumed that the SGSN already knew the context.

The association requirement context data may be stored at at the first packet switched network control node, e.g. the SGSN, so that it may be used to determine action to be taken following receipt of the further update. The association requirement context data may comprise an indicator that an association has been formed between the second packet switched network control node and the circuit switched network control node, so that the association requirement context data may be used as an indicator that the user equipment is configured for a feature that requires an association to be formed between the second packet switched network control node and the circuit switched network control node. This may be used as an indicator that such an association is required if the user equipment updates towards the second packet switched control node.

In dependence on the step of receiving a further update of the user equipment to the first radio access network, action may be taken to allow a second association between the second packet switched network control node and the circuit switched network control node to be established in the case of a further update of the user equipment from the second radio access network towards the second packet switched control node. The action may be inhibiting sending an ISR indicator to the UE, i.e. sending a mobility management message, such as a routing area update accept message, without an ISR indicator enabled. As a result, ISR is not enabled, so that mobility signalling may take place to cause a SGs association to be set up again. Setting up the SGs association may enable a circuit switched fall back or a SMSoverSGs feature to be used at the user equipment.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method by a first network control node in a communications network, the method comprising:
    receiving, by the first network control node, a first update message of a terminal via a first radio access network;
    after a second update message of the terminal is transmitted to a second network control node via a second radio access network and an idle mode signaling reduction (ISR) mechanism is activated, receiving, by the first network control node, a context-related message from the second network control node, the context-related message including context data indicating an association requirement between the second network control node and a circuit switched network control node; and if a third update message of the terminal is received by the first network control node via the first radio access network, deactivating, by the first network control node, the ISR mechanism based on the context data and based on the ISR mechanism being activated before the third update message of the terminal is received; and transmitting, by the first network control node, information for the deactivation of the ISR mechanism to the terminal.

2. A method according to claim 1, wherein the context-related message is a context request message sent from the second network control node to the first network control node, the context request message including an indicator that the association requirement context data is to be stored at the first network control node.

3. A method according to claim 1, wherein the context data includes an indicator that an association has been formed between the second network control node and the circuit switched network control node.

4. A method according to claim 3, wherein the association which has been formed is an association via an interface between the second network control node and the circuit switched network control node.

5. A method according to claim 1, wherein the first radio access network includes a plurality of routing areas served by the first network control node; and wherein the second radio access network includes a tracking area list indicating tracking areas served by the second network control node, and if the first update message of the terminal to the first radio access network is received, the terminal is in a first routing area of the plurality of routing areas, and if the third update message of the terminal to the first radio access network is received the terminal is in a second routing area of the plurality of routing areas.

6. A method according to claim 1, the method comprising:
allowing a second association between the second network control node and the circuit switched network control node to be established if a fourth update message of the terminal is transmitted via the second radio access network towards the second network control node.

7. A method according to claim 6, wherein the allowing the second association between the second network control node and the circuit switched network control node to be established requires signalling to be received by the second network control node, wherein the signalling would not have been received if the ISR mechanism had not been at least suppressed.

8. A method according to claim 6,
wherein the first and second radio access networks are configured with the ISR mechanism whereby signalling between the first and second network control nodes and the terminal may be reduced when the terminal is in an idle mode, and
wherein the allowing comprises sending a mobility management message including the information from the first network control node to the terminal causing the ISR mechanism to be deactivated to allow the fourth update message of the terminal via the second radio access network towards the second network control node.

9. A method according to claim 1, wherein the context data is stored as a result of receiving indication of the successful establishment of an association between the second network control node and the circuit switched network control node.

10. A method according to claim 1, wherein the context data is stored in dependence on the terminal using a circuit-switched fallback feature, the circuit-switched fallback feature allowing the terminal to fall back to circuit switched call in the first radio access network in preference to a packet switched call in the second radio access network.

11. A method according to claim 1, wherein the context data is stored in dependence on the terminal using a messaging feature, the messaging feature allowing short message service (SMS) messages to be sent using an association between the second network control node and the circuit switched network control node.

12. A method according to claim 11, wherein the messaging feature is short message service over SGs (SMS-overSGs).

13. A method according to claim 1, wherein a fourth update message of the terminal is transmitted to the second radio access network after the terminal receives the information for the deactivation of ISR, and an association between the second network control node and the circuit switched network control node is established based on the information.

14. A method according to claim 13, wherein the established association is an association via an interface between the second network control node and the circuit switched network control node.

15. A method according to claim 1, wherein the first network control node is a serving GPRS support node (SGSN), the second network control node is a mobility management entity (MME) and the circuit switched network control node is a mobile switching centre (MSC).

16. A method according to claim 1, the method comprising;
initially storing terminal context data at the first network control node in response to the reception of the first update message of the terminal,
wherein the initially stored terminal context data does not include context data indicating the association requirement between the second network control node and the circuit switched network control node in the case of an update of the terminal to the second radio access network.

17. A first network control node in a communications network, comprising:
a transceiver for transmitting and receiving a signal; and
a controller is configured to:
receive, by the transceiver, a first update message of a terminal via a first radio access network;
after a second update message of the terminal is transmitted to a second network control node via a second radio access network and an idle mode signaling reduction (ISR) mechanism is activated, receive, from the second network control node by the transceiver, a context-related message including context data indicating an association requirement between the second network control node and a circuit switched network control node; and
if receiving a third update message of the terminal by the transceiver via the first radio access network, deactivate the ISR mechanism based on the context data and based on the ISR mechanism being activated before receiving the third update message of the terminal by the transceiver; and transmit, by the transceiver, information for the deactivation of the ISR mechanism to the terminal.

18. A second network control node in a communications network, comprising:

a transceiver for transmitting and receiving a signal; and a controller is configured to:

after a first update message of a terminal is transmitted via a first radio access network to a first network control node, receive, by the transceiver, a second update message of the terminal via a second radio access network; and transmit, by the transceiver, a context-related message including context data indicating an association requirement between the second network control node and a circuit switched network control node, wherein the context data configures the first network control node to deactivate the idle mode signaling reduction (ISR) mechanism, if a third update message of the terminal is transmitted via the first radio access network to the first network control node, the ISR mechanism is deactivated by the first network control node based on the context data and based on the ISR mechanism being activated by the second network control node before the third update message of the terminal is transmitted to the first network control node, and information for the deactivation of the ISR mechanism is transmitted from the first network control node to the terminal.

* * * * *